(12) United States Patent
DeLugan et al.

(10) Patent No.: US 10,160,545 B2
(45) Date of Patent: Dec. 25, 2018

(54) RAM AIR HEAT EXCHANGER

(71) Applicant: Hamilton Sundstrand Corporation, Windsor Locks, CT (US)

(72) Inventors: Anthony DeLugan, Windsor Locks, CT (US); Michael Doe, Southwick, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 199 days.

(21) Appl. No.: 14/886,365

(22) Filed: Oct. 19, 2015

(65) Prior Publication Data

US 2017/0106984 A1    Apr. 20, 2017

(51) Int. Cl.
| | |
|---|---|
| *B60H 3/00* | (2006.01) |
| *F28F 3/00* | (2006.01) |
| *F28F 19/00* | (2006.01) |
| *B64D 13/00* | (2006.01) |
| *F28F 3/02* | (2006.01) |
| *F28D 9/00* | (2006.01) |
| *F28D 21/00* | (2006.01) |

(52) U.S. Cl.
CPC ........... B64D 13/00 (2013.01); F28D 9/0068 (2013.01); F28F 3/025 (2013.01); *F28D 9/0025* (2013.01); *F28D 9/0056* (2013.01); *F28D 2021/0021* (2013.01); *F28F 2250/106* (2013.01)

(58) Field of Classification Search
CPC ..... F28D 9/0025; F28D 9/0056; B64D 13/00; F28F 3/025

USPC ........................................ 165/44, 166, 134.1
See application file for complete search history.

(56) References Cited

U.S. PATENT DOCUMENTS

| | | | | |
|---|---|---|---|---|
| 3,907,032 | A * | 9/1975 | DeGroote ........... | F28D 1/05366 165/143 |
| 4,600,050 | A * | 7/1986 | Noren ................. | F28D 15/0275 165/104.14 |
| 4,862,952 | A * | 9/1989 | Tarasewich ........... | F28D 9/0068 165/159 |
| 4,913,776 | A * | 4/1990 | Finnemore ............ | F28D 9/0025 165/166 |
| 2003/0164233 | A1* | 9/2003 | Wu ....................... | F28D 1/0308 165/166 |
| 2005/0274501 | A1* | 12/2005 | Agee ..................... | F28D 9/0062 165/146 |
| 2007/0107889 | A1* | 5/2007 | Zaffetti ................. | F28D 9/0062 165/166 |

(Continued)

FOREIGN PATENT DOCUMENTS

EP    0952419 A1 * 10/1999    ........... F25J 3/04412

*Primary Examiner* — Len Tran
*Assistant Examiner* — Paul Alvare
(74) *Attorney, Agent, or Firm* — Cantor Colburn LLP

(57) ABSTRACT

A heat exchanger to exchange heat between a ram air flow and a liquid flow includes a plurality of ram air layers that direct air, wherein each ram air layer is a single pass layer including a plurality of ram air fins in fluid communication with the ram air flow, and a plurality of liquid pass layers, wherein each liquid pass layer is a five pass layer including a plurality of liquid pass fins in fluid communication with the liquid flow, and each of the plurality of liquid pass layers is disposed adjacent to at least one ram air layer of the plurality of ram air layers.

19 Claims, 8 Drawing Sheets

(56) References Cited

U.S. PATENT DOCUMENTS

2013/0299144 A1* 11/2013 Van Lieu ............... F28F 3/025
  165/165

* cited by examiner

US 10,160,545 B2

RAM AIR HEAT EXCHANGER

BACKGROUND

The subject matter disclosed herein relates to heat exchangers, and more particularly, to a heat exchanger for providing sufficient cooling capacity for a power electronics cooling system (PECS) for an aircraft.

Typically, power electronics of an aircraft are cooled by a power electronics cooling system (PECS). Certain aircraft configurations may not provide a suitable heat exchanger location or heat exchanger capacity for power electronics cooling demands. The use of a heat exchanger that can provide adequate cooling capacity is desired.

BRIEF SUMMARY

According to an embodiment, a heat exchanger to exchange heat between a ram air flow and a liquid flow includes a plurality of ram air layers that direct air, wherein each ram air layer is a single pass layer including a plurality of ram air fins in fluid communication with the ram air flow, and a plurality of liquid pass layers, wherein each liquid pass layer is a five pass layer including a plurality of liquid pass fins in fluid communication with the liquid flow, and each of the plurality of liquid pass layers is disposed adjacent to at least one ram air layer of the plurality of ram air layers.

According to an embodiment, a power electronics cooling system includes a heat exchanger to exchange heat between a ram air flow and a liquid flow includes a plurality of ram air layers that direct air, wherein each ram air layer is a single pass layer including a plurality of ram air fins in fluid communication with the ram air flow, and a plurality of liquid pass layers, wherein each liquid pass layer is a five pass layer including a plurality of liquid pass fins in fluid communication with the liquid flow, and each of the plurality of liquid pass layers is disposed adjacent to at least one ram air layer of the plurality of ram air layers.

Technical function of the embodiments described above includes a plurality of ram air layers, wherein each ram air layer is a single pass layer including a plurality of ram air fins in fluid communication with the ram air flow, and a plurality of liquid pass layers, wherein each liquid pass layer is a five pass layer including a plurality of liquid pass fins in fluid communication with the liquid flow, and each of the plurality of liquid pass layers is disposed adjacent to at least one ram air layer of the plurality of ram air layers.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
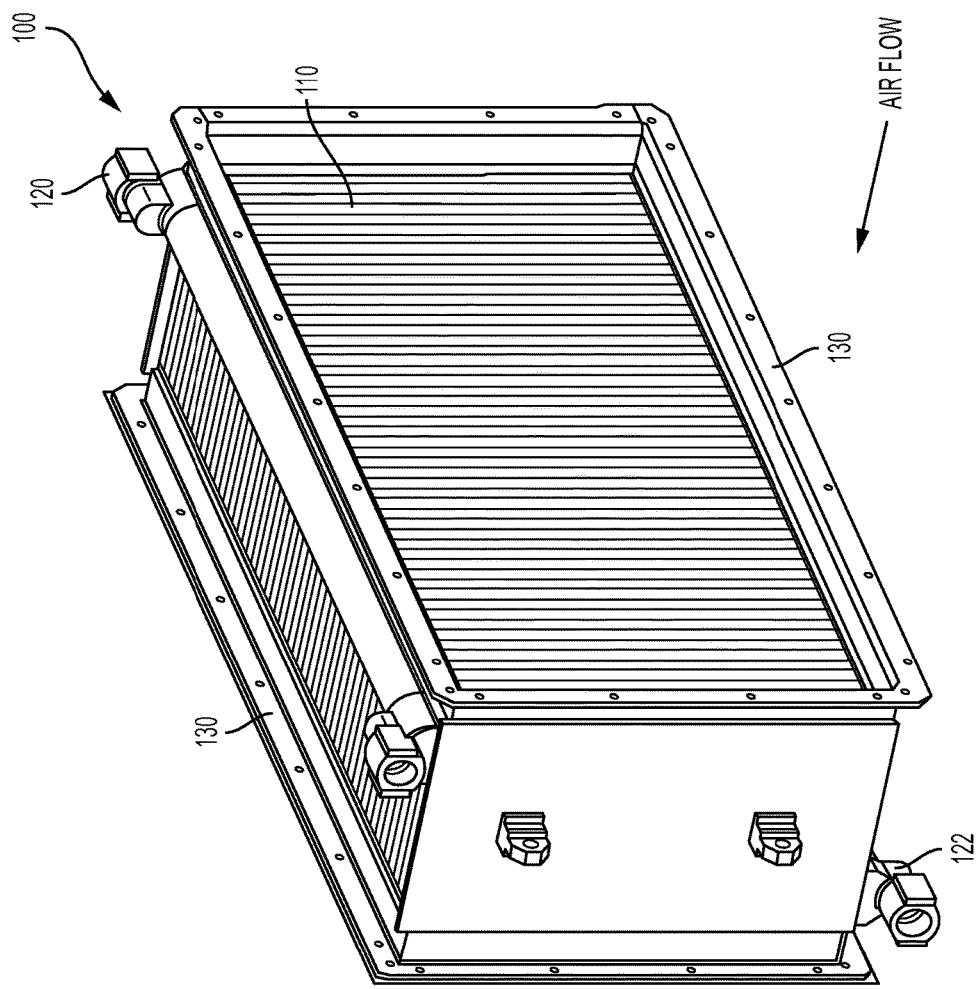
FIG. 1 is an isometric view of one embodiment of a heat exchanger for use with a power electronics cooling system.

Referring now to the drawings, FIG. 1 shows a heat exchanger 100. In the illustrated embodiment, the heat exchanger 100 includes a core 110, a liquid inlet 122, a liquid outlet 120, and a flange 130. The heat exchanger 100 can be utilized with a Power Electronics Cooling System (PECS) to provide sufficient cooling capacity for the power electronics to be cooled. In certain embodiments, the heat exchanger 100 can be disposed in an unpressurized area of an aircraft, and further can be rotated for either left hand or right hand installations. Advantageously, the heat exchanger 100 can replace other heat exchangers, such as a forward cabin air conditioning heat exchanger. In the illustrated embodiment, the heat exchanger 100 can utilize a five pass counter flow liquid (propylene glycol) circuit to provide sufficient cooling capacity. Further, the heat exchanger 100 can be dimensioned for proper mounting within a desired location, structural requirements, and to provide structural support for the environmental control system hardware.

In the illustrated embodiment, the elements of the heat exchanger 100 can be attached via brazing, welding, or any other suitable attachment method. The elements of the heat exchanger 100 can be formed of aluminum. In the illustrated embodiment, the liquid inlet 122 provides a liquid coolant flow to the liquid layers of the core 110. After the heat from the liquid flow has been transferred with the ram air flow through the ram air layers of the core 110, the liquid outlet 120 directs the liquid coolant flow to the remainder of the PECS system. In the illustrated embodiment, the flange 130 is attached via welding or brazing to the core 110, and can direct ram air flow to the core 110 and further provide protection and structural support to the core 110 as well as provide attachment points.

Figure 2:
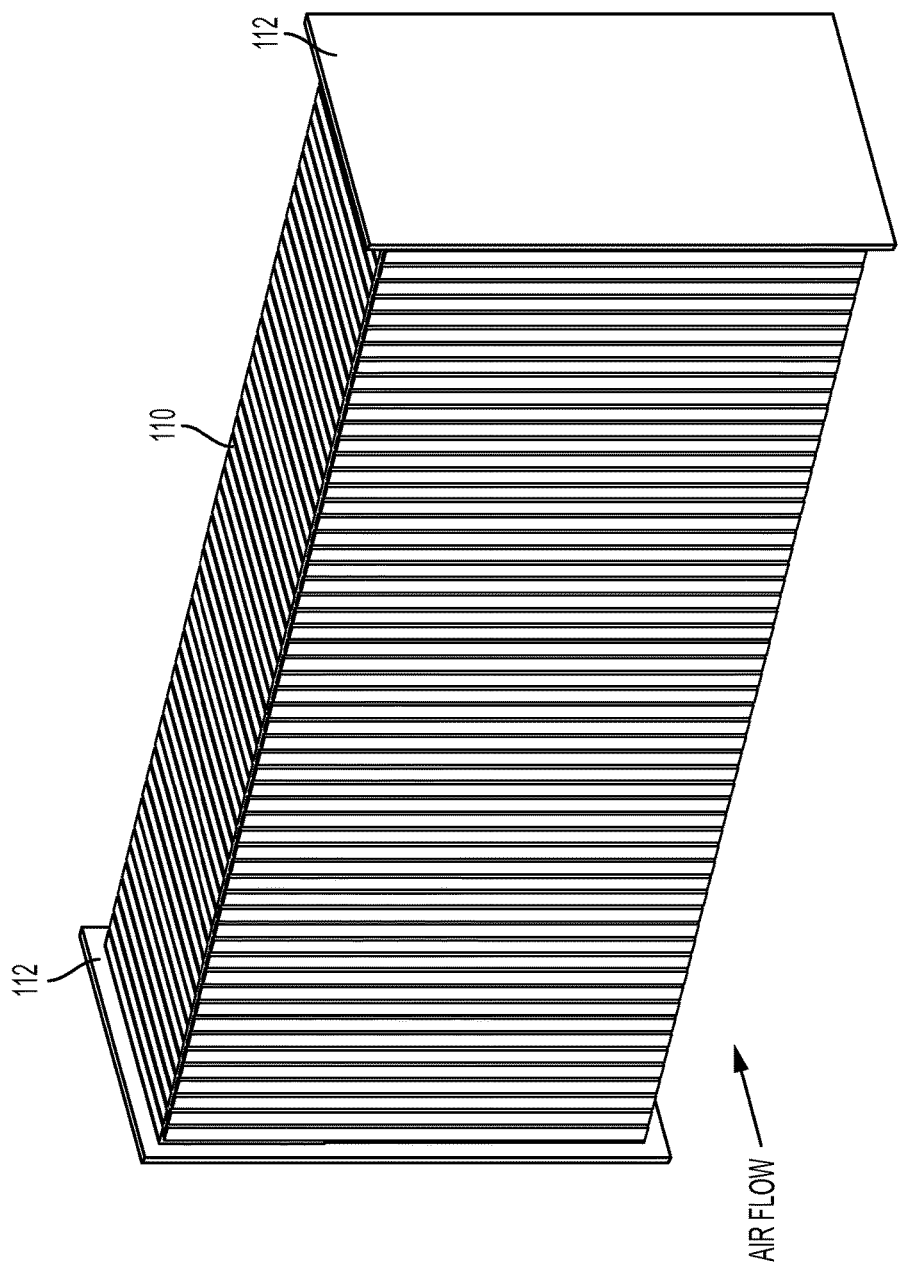
FIG. 2 is an isometric view of one embodiment of a heat exchanger core for use with the heat exchanger of FIG. 1.
Figure 3:
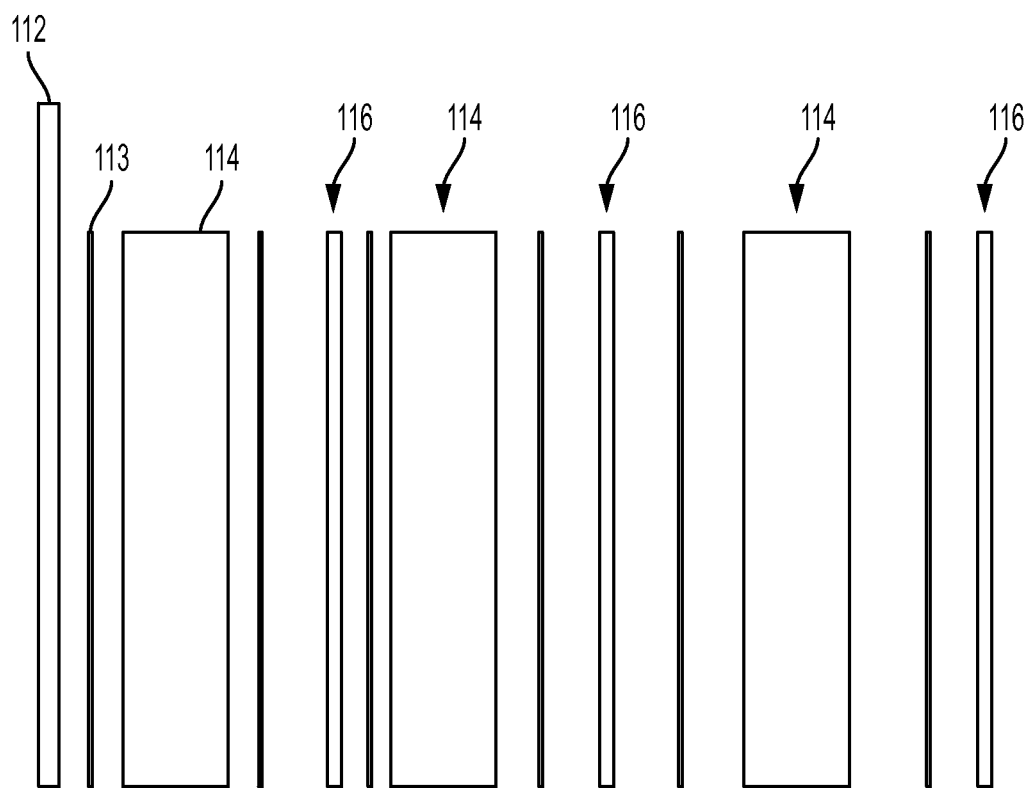
FIG. 3 is a partial exploded view of the heat exchanger core of FIG. 2.

Referring to FIGS. 2 and 3, the core 110 is shown. In the illustrated embodiment, the core 110 includes end sheets 112, parting sheets 113, ram layers 114, and liquid layers 116. In the illustrated embodiment, heat is removed from the liquid passing through the liquid layers 116 to the air flow passing through the ram layers 114. In the illustrated embodiment, the core 110 provides for cross flow between the air flow in the ram layers 114 and the liquid flow in the liquid layers 116. In the illustrated embodiment, the air flow is received from ram outside air directed to the core 110. In the illustrated embodiment, the end sheets 112 provide structural support to the core 110 and further provides protection to the core 110. In the illustrated embodiment, the parting sheets 113 facilitate or otherwise allow for thermal communication and heat transfer between the ram layers 114 and the liquid layers 116. Further, the parting sheets 113 protect the fins of the ram layers 114 and the liquid layers 116. Additionally, the parting sheets 113 may provide structural support for the core 110

Figure 4A:
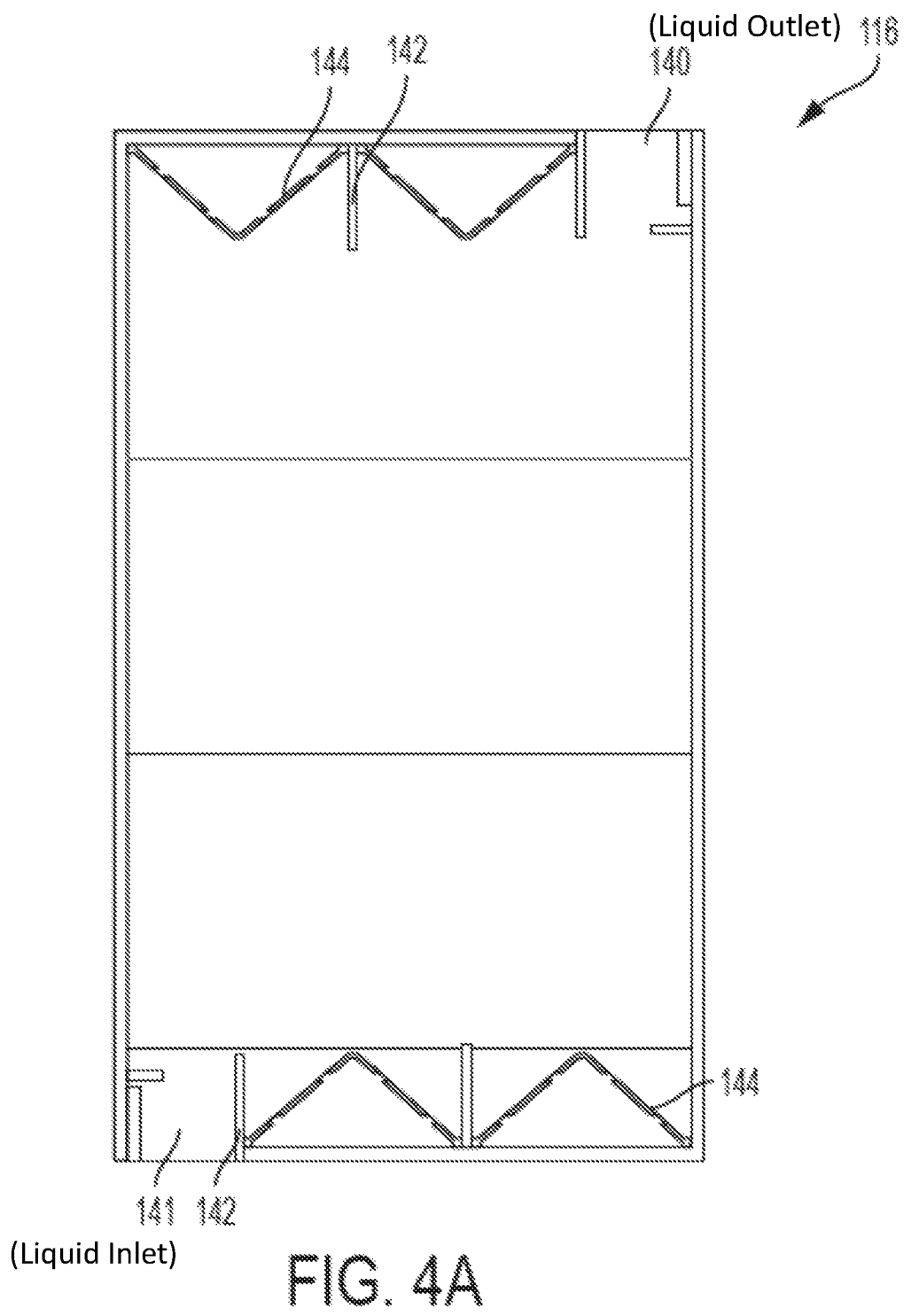
FIG. 4A is an elevation view of a liquid pass layer of the heat exchanger core of FIG. 2.
Figure 4B:
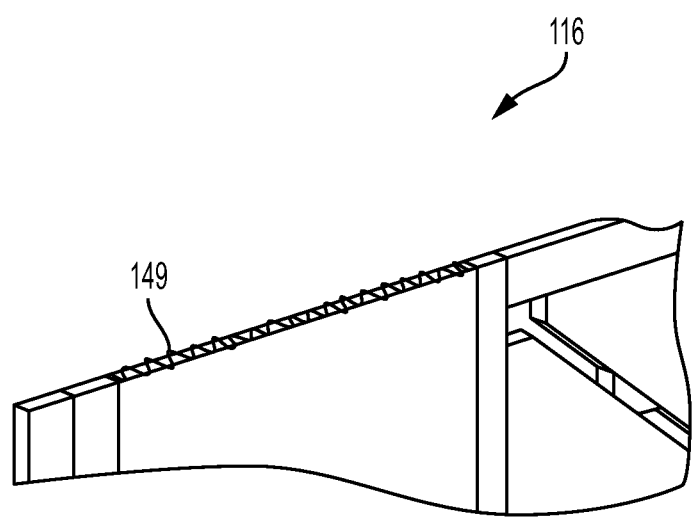
FIG. 4B is a partial isometric view of the liquid pass layer of FIG. 4A.
Figure 5:
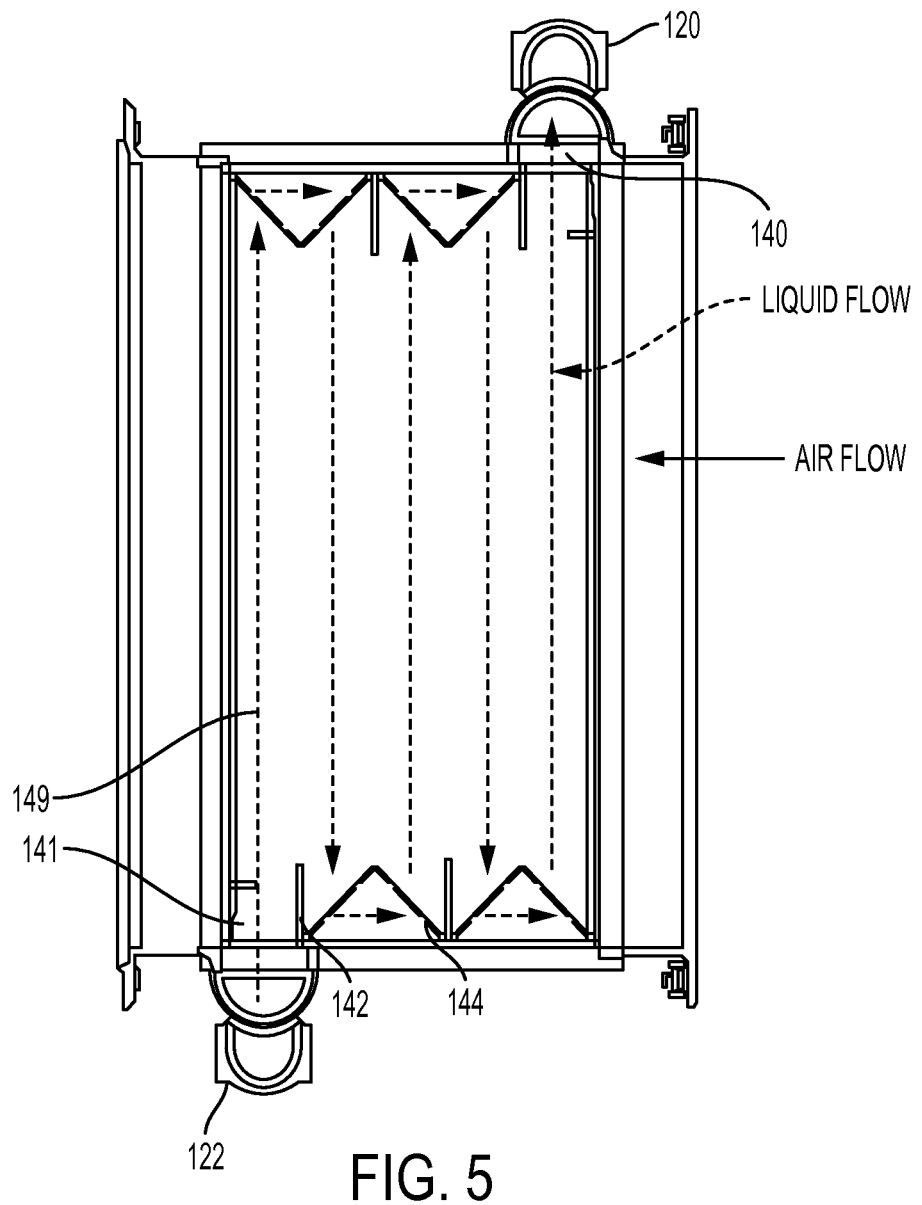
FIG. 5 is a pictorial illustration of a liquid flow path through the liquid pass layer of FIG. 4A.

Referring to FIGS. 4A, 4B, and 5, a liquid layer 116 is shown. In the illustrated embodiment, the liquid layer 116 includes an inlet 141, an outlet 140, closure bars 142, tent fins 144, and fins 149. In the illustrated embodiment, each liquid layer 116 provides a five pass liquid flow path. In the illustrated embodiment, the core 110 includes 54 liquid layers 116 that are each disposed adjacently to ram air layers 116. In certain embodiments, the core 110 can include 52 to 56 liquid layers 116.

In the illustrated embodiment, coolant is received from the fluid inlet 122 to be received within the fluid layer inlet 141. The coolant may be any suitable coolant, including, but not limited to propylene glycol. As the fluid flow is received, the fluid flows through and is directed by the fins 149.

In the illustrated embodiment, the fins 149 can direct flow and transfer heat from the liquid within the liquid layer 116. In the illustrated embodiment, the fin height of the fins 149 is 0.058 inches, while in other embodiments, the fin height can range from 0.048 inches to 0.068 inches. In the illustrated embodiment, the fin density of the fins 149 is 12 fins per inch, while in other embodiments, the fin density can range from 10 fins per inch to 14 fins per inch. In the illustrated embodiment, the fin thickness of the fins 149 is 0.003 inches, while in other embodiments, the fin thickness can range from 0.002 inches to 0.004 inches. In the illustrated embodiment, the fins 149 are ruffled type fins.

As best shown in FIG. 5, the fins 149 can direct the liquid flow in five passes through the liquid layer 116 from the liquid inlet 141 to the liquid outlet 140. In order to direct the liquid flow within the liquid layer 116, closure bars 142 can be utilized to direct fluid flow and provide structural rigidity to the liquid layers 116. In the illustrated embodiment, the tent fins 144 can direct the fluid flow from one direction to the alternate direction to begin the next pass. Advantageously, the five pass circuit of the liquid layer 116 allows for enhanced heat transfer. The fluid flow can be cross flow to the ram air flow of the ram air layers 114. In the illustrated embodiment, the total flow length is 14.7 inches, while in other embodiments, the flow length can range from 13.7 inches to 15.7 inches. In the illustrated embodiment, fluid flow out of the outlet 140 to the outlet 120.

During operation, the liquid layers 116 may operate within the following operating conditions. During normal operation, the maximum normal pressure (psig) is 200.46 psig at 70° F. The maximum temperature (° F.) is 185° F. at 182.70 psig. The maximum flow (ppm) is 285.1 lbm/min at 177.4 psig and 185° F.

During maximum single failure conditions the maximum pressure (psig) is 254 psig at 150° F. The maximum temperature is 185° F. at 233 psig. The maximum flow (ppm) is 285.1 lbm/min at 228 psig and 185° F. The ambient temperature range (° F., min and max) is −40° F. to 185° F.

Figure 6A:
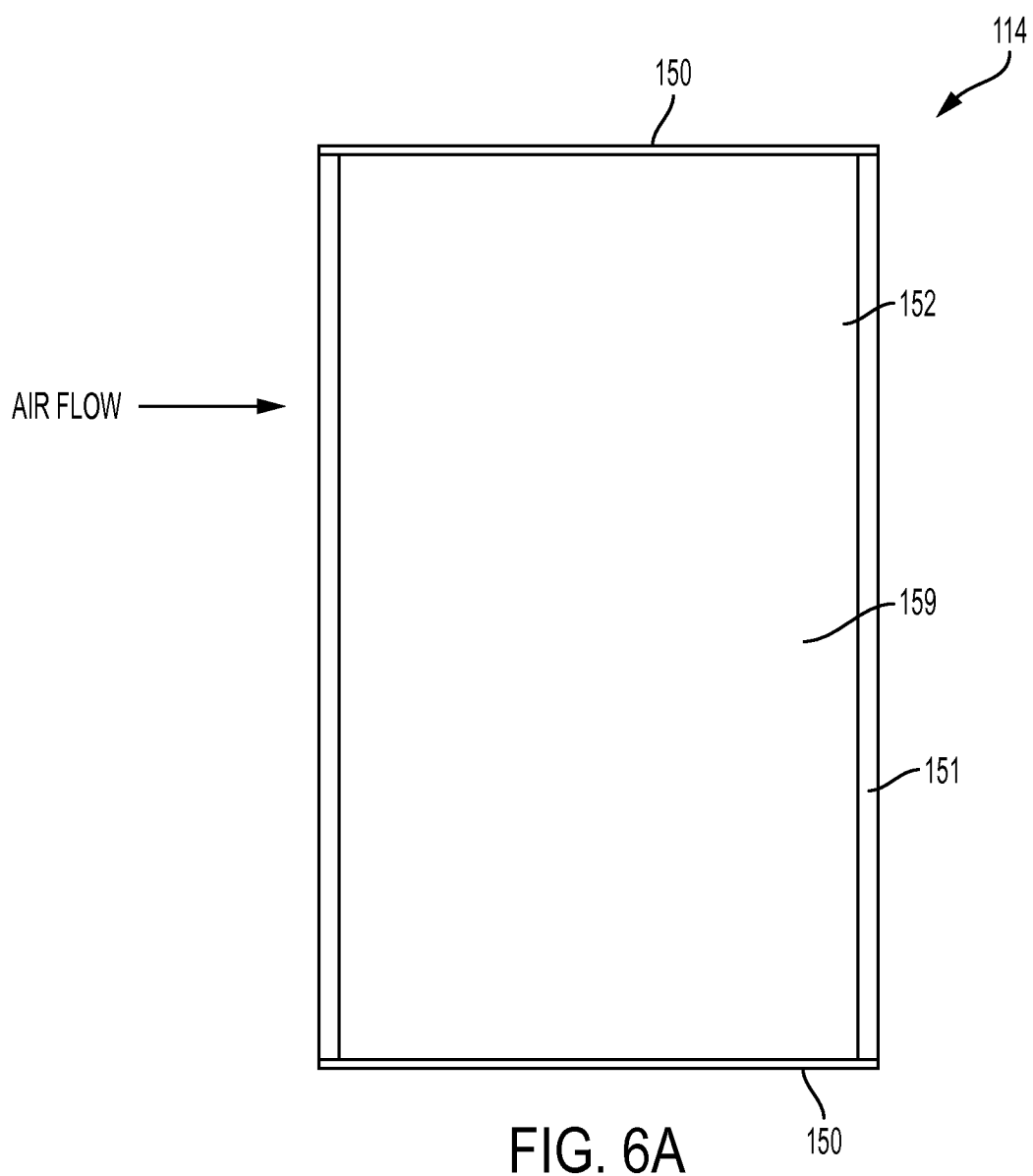
FIG. 6A is an elevation view of a ram air layer of the heat exchanger core of FIG. 2.
Figure 6B:
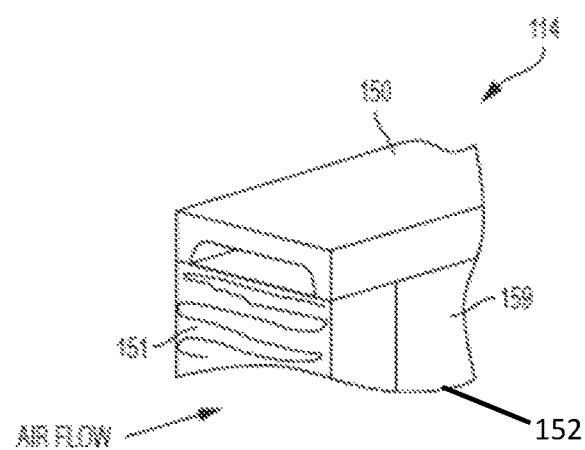
FIG. 6B is a partial isometric view of the ram air layer of FIG. 6A.

Referring to FIGS. 6A and 6B, a ram air layer 114 is shown. In the illustrated embodiment, the ram air layer 114 includes closure bars 150, guard fins 151, and ram air fins 152. In the illustrated embodiment, each ram air layer 114 provides a single pass ram air flow path. In the illustrated embodiment, the core 110 includes 55 ram air layers 114, alternating between the liquid layers 116. In certain embodiments, the core 110 can include 53 to 57 ram air layers 114.

In the illustrated embodiment, the ram air flow can enter from one guard fin 151 side, through the regular ram air fins 152 with fin bodies 159 and exit through the opposite guard fin 151. In certain embodiments, the air can be directed by the flanges 130.

In the illustrated embodiment, the guard fins 151 and the ram air fins 152 can work together to direct flow and transfer heat to the airflow within the ram air layer 114. In the illustrated embodiment, the guard fins 151 are utilized to protect the edges of the ram air layers 114 while providing structural support. In the illustrated embodiment, the guard fins 151 have a straight shape. In the illustrated embodiment, the fin height of the guard fins 151 is 0.500 inches, while in other embodiments, the fin height can range from 0.400 inches to 0.600 inches. In the illustrated embodiment, the fin density of the guard fins 151 is 9 fins per inch, while in other embodiments, the fin density can range from 7 fins per inch to 11 fins per inch. In the illustrated embodiment, the fin thickness of the guard fins 151 is 0.012 inches, while in other embodiments, the fin thickness can range from 0.011 inches to 0.013 inches. In the illustrated embodiment, the flow length for each portion of guard fins 151 is 0.25 inches per side or 0.50 inches total.

In the illustrated embodiment, the ram air fins 152 are ruffled type fins, with a fin body 159. In the illustrated embodiment, the fin height of the ram air fins 152 is 0.500 inches, while in other embodiments, the fin height can range from 0.400 inches to 0.600 inches. In the illustrated embodiment, the fin density of the ram air fins 152 is 24 fins per inch, while in other embodiments, the fin density can range from 22 fins per inch to 26 fins per inch. In the illustrated embodiment, the fin thickness of the ram air fins 152 is 0.003 inches, while in other embodiments, the fin thickness can range from 0.002 inches to 0.004 inches. In the illustrated embodiment, the flow length within the ram air fins 152 is 6.8 inches, while in other embodiments, the flow length can range from 5.8 to 7.8 inches. In certain embodiments, the total ram air flow length is 7.3 inches.

In the illustrated embodiment, the ram air layers 114 can receive an air flow in the direction indicated. In order to direct the flow within the ram air layers 114, the closure bars 150 direct the air flow and provide structural rigidity to the ram air layers 114. Advantageously, the ram air layers 114 can be oriented such that the air flow is a cross flow to the liquid flow of the liquid layers 116.

During operation, the ram air layers 114 may operate within the following operating conditions. During normal operation, the maximum normal pressure (psig) is 2.35 psig at 140.1° F. The maximum temperature (° F.) is 140.1° F. at 2.35 psig. The maximum flow (ppm) is 750.6 lbm/min at 2.35 psig and 140.1° F.

During maximum single failure conditions the maximum pressure (psig) is 2.86 psig at 144.3° F. The maximum temperature (° F.) is 144.3° F. at 2.86 psig. The maximum flow (ppm) is 800.3 lbm/min at 2.86 psig and 132.6° F. The ambient temperature range (° F., min and max) is −40° F. to 185° F.

Advantageously the cross flow configuration and arrangement of the liquid and air layers 114 and 116 allows for heat transfer between the liquid and the air. Heat from the liquid coolant can effectively be removed from the liquid and transferred to the air to allow for effective PECS operation.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A heat exchanger to exchange heat between a ram air flow and a liquid flow, comprising:
a plurality of ram air layers that direct air, wherein each ram air layer is a single pass layer including a plurality of ram air fins in fluid communication with the ram air flow; and
a plurality of liquid pass layers, wherein each liquid pass layer is a five pass layer including:
a liquid inlet defined through a first end wall;
a liquid outlet defined through a second end wall opposite the first end wall;
a plurality of liquid pass fins in fluid communication with the liquid flow, and each of the plurality of liquid pass layers is disposed adjacent to at least one ram air layer of the plurality of ram air layers;
first tent fins and second tent fins proximate to the first and second end walls, respectively, which are respectively interposed between sequential ones of the liquid pass fins and configured to direct the liquid flow from a first direction, to an intermediate direction and to a second direction opposite the first direction; and
first closure bars and second closure bars proximate to the first and second end walls, respectively, which are interposed between adjacent tent fins of the first tent fins and the second tent fins and corresponding sections of the liquid flow in the first and second directions, wherein:
the first tent fins and one of the first closure bars that is remote from the liquid inlet terminate at an interior plane of the first end wall,
the second tent fins and one of the second closure bars that is remote from the liquid outlet terminate at an interior plane of the second end wall,
the one of the first closure bars that is proximate to the liquid inlet terminates at an exterior plane of the first end wall, and
the one of the second closure bars that is proximate to the liquid outlet terminates at an exterior plane of the second end wall.

2. The heat exchanger of claim 1, wherein the plurality of liquid pass fins each have a liquid pass fin height of 0.058 inches.

3. The heat exchanger of claim 1, wherein the plurality of liquid pass fins have a liquid pass fin density of between 10 to 14 fins per inch.

4. The heat exchanger of claim 1, wherein the plurality of liquid pass fins each have a liquid pass fin thickness of between 0.002 to 0.004 inches.

5. The heat exchanger of claim 1, wherein the plurality of ram air fins each have a ram air fin height of 0.500 inches.

6. The heat exchanger of claim 1, wherein the plurality of ram air fins includes a plurality of ruffled ram air fins and a plurality of straight ram air fins.

7. The heat exchanger of claim 6, wherein the plurality of ruffled ram air fins have a ruffled ram air fin density of between 22 to 26 fins per inch.

8. The heat exchanger of claim 6, wherein the plurality of ruffled ram air fins have a ruffled ram air fin thickness of between 0.002 to 0.004 inches.

9. The heat exchanger of claim 6, wherein the plurality of straight ram air fins have a straight ram air fin density of between 7 to 11 fins per inch.

10. The heat exchanger of claim 6, wherein the plurality of straight ram air fins have a straight ram air fin thickness of between 0.011 to 0.013 inches.

11. The heat exchanger of claim 1, wherein each ram air layer has a ram air flow length of 7.3 inches.

12. The heat exchanger of claim 1, wherein each liquid pass layer has a total liquid flow length of 14.7 inches.

13. The heat exchanger of claim 1, wherein the plurality of ram air layers is between 53 to 57 ram air layers.

14. The heat exchanger of claim 1, wherein the plurality of liquid pass layers is between 52 to 56 liquid pass layers.

15. The heat exchanger of claim 1, further comprising a plurality of parting sheets, wherein each parting sheet is disposed between each of the plurality of liquid pass layers and each of the plurality of ram air layers.

16. A power electronics cooling system, comprising:
a heat exchanger to exchange heat between a ram air flow and a liquid flow, including:
a plurality of ram air layers that direct air, wherein each ram air layer is a single pass layer including a plurality of ram air fins in fluid communication with the ram air flow; and
a plurality of liquid pass layers, wherein each liquid pass layer is a five pass layer including:
a liquid inlet defined through a first end wall;
a liquid outlet defined through a second end wall opposite the first end wall;
a plurality of liquid pass fins in fluid communication with the liquid flow, and each of the plurality of liquid pass layers is disposed adjacent to at least one ram air layer of the plurality of ram air layers;
first tent fins and second tent fins proximate to the first and second end walls, respectively, which are respectively interposed between sequential ones of the liquid pass fins and configured to direct the liquid flow from a first direction, to an intermediate direction and to a second direction opposite the first direction; and
first closure bars and second closure bars proximate to the first and second end walls, respectively, which are interposed between adjacent tent fins of the first tent fins and the second tent fins and corresponding sections of the liquid flow in the first and second directions, wherein:
the first tent fins and one of the first closure bars that is remote from the liquid inlet terminate at an interior plane of the first end wall,
the second tent fins and one of the second closure bars that is remote from the liquid outlet terminate at an interior plane of the second end wall,
the one of the first closure bars that is proximate to the liquid inlet terminates at an exterior plane of the first end wall, and
the one of the second closure bars that is proximate to the liquid outlet terminates at an exterior plane of the second end wall.

17. The heat exchanger of claim 1, wherein the tent fins of the first tent fins and the second tent fins comprise opposite sides tapering from an end plane toward one another to form a point and a proximal one of the closure bars of the first closure bars and the second closure bars extends from the end plane to a plane of the point.

18. The heat exchanger of claim 17, wherein the liquid flow in the first direction is directed to flow in the intermediate direction at one of the opposite sides of each of the first and second tent fins and is directed to flow in the second direction at the other of the opposite sides of each of the first and second tent fins.

19. The power electronics cooling system of claim 16, wherein the tent fins of the first tent fins and the second tent fins comprise opposite sides tapering from an end plane toward one another to form a point and a proximal one of the closure bars of the first closure bars and the second closure bars extends from the end plane to a plane of the point.

\* \* \* \* \*